(12) United States Patent
Dankenbring et al.

(10) Patent No.: US 7,702,613 B1
(45) Date of Patent: Apr. 20, 2010

(54) SYSTEM AND METHODS FOR VALIDATING AND DISTRIBUTING TEST DATA

(75) Inventors: David W. Dankenbring, Overland Park, KS (US); James E. Bessler, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 955 days.

(21) Appl. No.: 11/434,672

(22) Filed: May 16, 2006

(51) Int. Cl.
*G06F 17/30* (2006.01)
*G06F 9/44* (2006.01)

(52) U.S. Cl. ............ 707/1; 707/3; 707/9; 707/10; 717/115; 717/116; 717/124

(58) Field of Classification Search ............ 707/1, 707/3, 9, 10; 717/115, 116, 124
See application file for complete search history.

(56) References Cited

U.S. PATENT DOCUMENTS

| | | | |
|---|---|---|---|
| 6,701,514 B1* | 3/2004 | Haswell et al. | 717/115 |
| 6,907,546 B1* | 6/2005 | Haswell et al. | 714/38 |
| 7,200,626 B1* | 4/2007 | Hoang et al. | 707/204 |
| 7,296,011 B2* | 11/2007 | Chaudhuri et al. | 707/3 |
| 7,424,702 B1* | 9/2008 | Vinodkrishnan et al. | 717/124 |
| 7,467,198 B2* | 12/2008 | Goodman et al. | 709/223 |
| 2003/0074606 A1* | 4/2003 | Boker | 714/42 |
| 2004/0106088 A1* | 6/2004 | Driscoll et al. | 434/118 |
| 2005/0192931 A1* | 9/2005 | Rogers | 707/1 |
| 2005/0222815 A1* | 10/2005 | Tolly | 702/185 |
| 2005/0268171 A1* | 12/2005 | House et al. | 714/32 |

* cited by examiner

*Primary Examiner*—Don Wong
*Assistant Examiner*—Thanh-Ha Dang

(57) ABSTRACT

Software-based systems and methods that may be used to validate and distribute test data are disclosed. In some embodiments, the data distribution method comprises combining data requests from multiple users into a single request, copying test data from enterprise databases in response to that request, and storing the data in a test data database. The data distribution method further comprises selecting test data contained in the test data database and copying that data to an output file in response to a user's access, and may further include deleting the test data copied from the test data database. The data distribution method may further comprise validating the test data and deleting erroneous test data from the test database. Copying selected test data to an output file may be performed in accordance with a user-selected format and a user-defined output file name and path.

18 Claims, 10 Drawing Sheets

FIG. 6

SYSTEM AND METHODS FOR VALIDATING AND DISTRIBUTING TEST DATA

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Product developers require test data with which to test products and services under development. It is important that this data be of such content and form that when used to test a new product, any errors generated during testing are attributed to failure of the product, not to erroneous test data. In the absence of error-free test data, a failure during testing of a new product requires an investigation to determine whether the product simply needs additional work or that the test data was bad. Such an investigation may take significant time, and therefore, increase development costs.

Many enterprises define an internal data management group ("Data Management"), consisting of an individual or individuals, which is responsible for providing test data to product developers. Data Management typically receives requests for test data from product developers and responds to each request on an individual first come, first serve basis. Data Management may fill each request by copying data from a source or sources and transmitting a text file containing that data to the requesting product developer by email. Distributing test data in this manner is inefficient for a number of reasons. First, Data Management copies test data from its source each time a request is made. Second, with each request, test data is converted to a text file and transmitted to the requesting product developer. Third, because of the overhead involved with requesting test data, product developers often request more test data than needed so as to avoid the need to submit a second request, should they require more test data. These larger-than-necessary requests for test data burden the already inefficient distribution method.

In addition to being inefficient, this method of distributing test data has other shortcomings. Distributing test data in text files transmitted via email is an unsecure method of sharing data. Unintended recipients, and/or hackers, may gain access to this data, which may include sensitive, even confidential, customer information. Also, test data distributed in this manner has not been validated, meaning it may contain erroneous data which when used may cause failures during testing and, as described above, increase development costs.

SUMMARY

Software-based systems and methods for validating and distributing test data are disclosed. In some embodiments, the data distribution method comprises copying test data from enterprise databases and storing that data in a test data database. Access rights for users to the test data are defined. The data distribution method further comprises selecting test data contained in the test data database and copying that data to an output file in response to a user's access and deleting test data copied from the test data database. Prior to copying test data from enterprise databases, multiple requests for test data are received and organized to define a combined request encompassing all requests. Data is then identified in the enterprise databases to fill the combined request. The data distribution method may further comprise validating the test data prior to selecting test data contained in the test data database. Validating may include deleting erroneous test data from the test database. Copying selected test data to an output file may be performed in accordance with a user-selected format and a user-defined output file name and path. The data distribution method may further comprise restoring test data deleted from the test data database.

Some enterprise network embodiments comprise a plurality of enterprise databases and a test data distribution system that includes a test data database into which data from the enterprise databases is copied. The test data distribution system is configured to validate data stored in the test data database. The enterprise network may further comprise the test data distribution system configured to limit user access to test data stored in the test data database, to select data stored in the test data database, and/or to copy selected data to an output file. The enterprise databases may store customer information, including account numbers and phone numbers, and business-specific information, including valid and invalid account numbers, types of accounts, and accounts in collections.

Some data distribution system embodiments comprise a validation subroutine, a security subroutine, a distribution subroutine, a change management subroutine and a data tracking subroutine. The validation subroutine is configured to validate data contained in a test data database. This subroutine utilizes at least one coordinator-specified validator to validate data. The validator is the criteria for validating account numbers, phone numbers, or other types of test data contained in the test data database. The validation subroutine may be further configured to delete erroneous test data from the test data database. The security subroutine is configured to permit limited access to the test data database. This subroutine is configured to limit access to the test data database to only users who submitted test data requests to a coordinator and to limit each user's access to only data requested by him. The distribution subroutine is configured to allowed selection of data contained in the test data database and copying of the selected data to an output file. The change management subroutine is configured to delete data copied from the test data database. The tracking subroutine is configured to document data retrieval by users copying test data from the test data database. The data distribution system may further comprise a data restoration subroutine configured to restore data deleted from the test data database using the data identification number documented by the data tracking subroutine.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 6 illustrates a GUI for security;

NOTATION AND NOMENCLATURE

Figure 1:
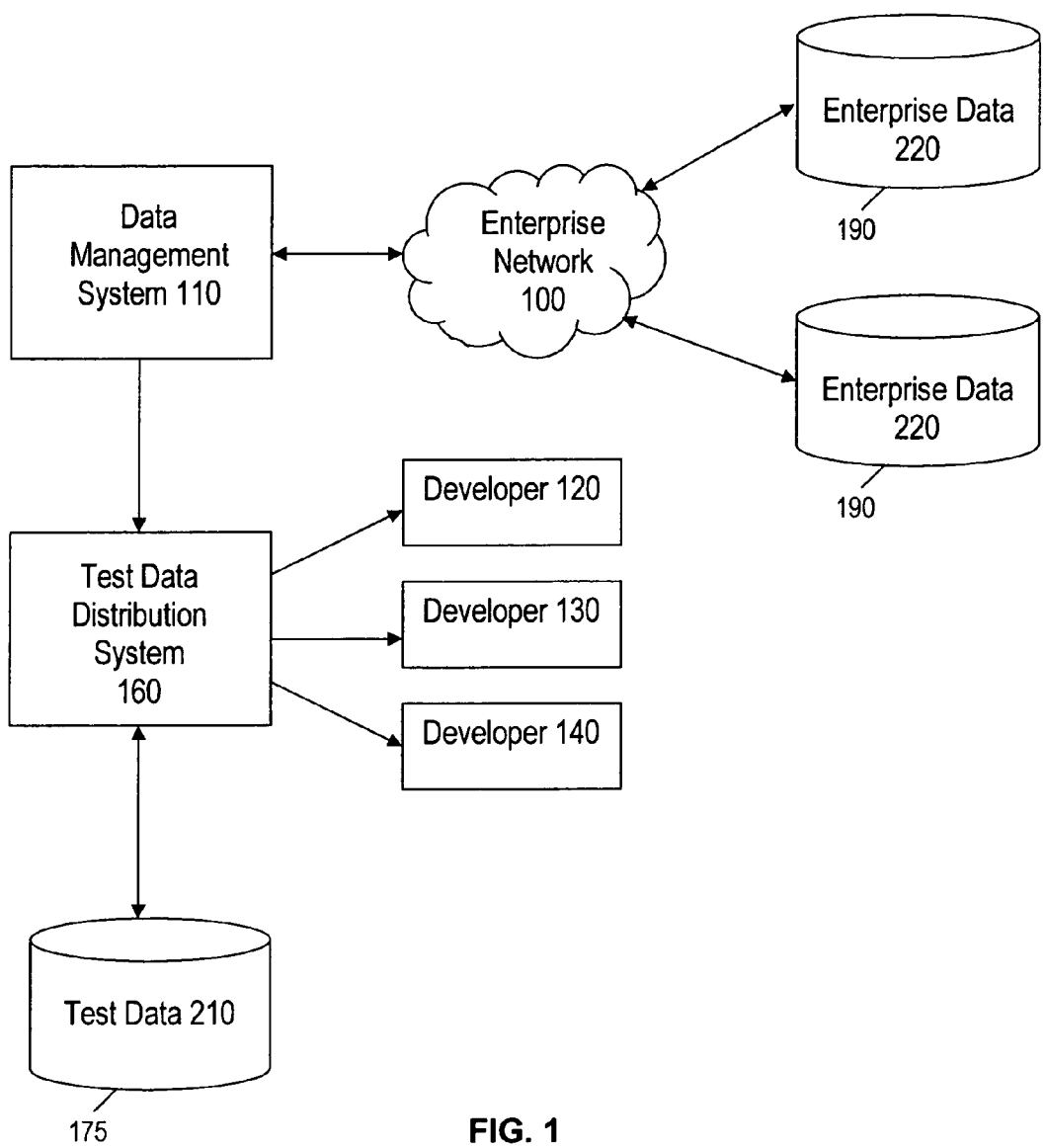
FIG. 1 is a block diagram of an illustrative test data distribution system embodied in an enterprise network.

Certain terms are used throughout the following description and claims to refer to particular components. This document does not intend to distinguish between components that differ in name but not function. In the following discussion and in the claims, the terms "including" and "comprising" are used in an open-ended fashion, and thus should be interpreted to mean "including, but not limited to . . .".

DETAILED DESCRIPTION

As explained above, existing methods for distributing test data to product developers are inefficient and may be unsecure. To address these shortcomings, software-based systems and methods for validating and distributing test data are disclosed. In response to multiple requests for test data from product developers, a combined request for data may be submitted, encompassing all individual requests, and subsequently filled by copying data from enterprise databases to a network-accessible database. Using the disclosed software tool, individuals who submitted requests for data may then access the database to select and copy requested data in a user-defined format to a user-defined output file.

This method of distributing data eliminates the traditional method of filling requests for data on an individual basis. It also provides a more secure means of distributing data than by email. Moreover, the disclosed software tool permits restricted access to the database containing test data, thus providing an additional level of security. Before data is distributed from the database, the software tool may be used to validate data contained in the database, thereby preventing the distribution of erroneous test data to product developers. This reduces product development costs by reducing the number of test failures and the time required to determine the source of the failure, whether caused by the product being tested or the test data.

The disclosed software tool also provides the means to track data usage, to prevent reuse of data, and to restore data erroneously deleted from the database. Traditional methods of distributing data include no means of tracking data usage for comparison to the volume of data actually requested by Users. The lack of data tracking combined with the inefficiency of these methods leads Users to request more data than they actually need because Users would rather request too much data than to find themselves short of data and having to wait while an additional request(s) is filled. As a result, more test data must be produced and supplied to Users than is actually used. This increases the time and cost to produce test data, some of which ultimately goes unused. The data tracking capability of the disclosed software tool eliminates such waste. How much test data is actually used by each User may be tracked and compared to how much he requested. This causes Users to submit data requests closer to what they actually need. In the event that a User requests more than he needs, the excess may be utilized by others who find themselves short of data. Thus, the overall effect is that less test data must be produced and less test data is wasted. That leads to savings in time and complexity in test data distribution.

Before describing in detail the disclosed systems, methods and software, it is desirable to identify several entities. All of the entities in the following examples exist within the context of a business enterprise. The Data Management Group (DMG) may be an entity or organization tasked by an enterprise to provide test data to others within the enterprise. In response to a request for test data, the DMG may copy data from a source or sources and store that data in a usable format in a network-accessible location such as a database. The DMG may consist of one or more persons, depending on the size of the enterprise.

The source from which the DMG copies data may be actual enterprise data, which is data compiled by the enterprise during its course of business and may include customer information such as names, account numbers, telephone numbers, etc. Enterprise data may be stored in one or more enterprise databases.

The DMG may supply data in this manner in response to a request from a Coordinator. The Coordinator may be a member within the DMG or may be a separate entity outside of the DMG. For example, each development project may have a designated Coordinator. The Coordinator may receive individual requests for test data, organize these requests by project, and then submit a single request for each project, encompassing all individual requests for that project. In this way, the Coordinator may act as the middleman between all those requesting test data and the DMG.

Requests for test data may come from product developers throughout the enterprise, regardless of the type of product under development. These product developers, referred to hereafter as Users, may be from a single product group or multiple product groups throughout the enterprise.

In summary, Users needing test data may submit individual requests for test data to the Coordinator, who, in turn, may organize these individual requests and periodically submit a combined request for test data to the DMG. In response to the Coordinator's request, the DMG may copy the requested data from enterprise databases and store it in a usable form in a database accessible to both the Coordinator and Users.

Turning now to the details of the disclosed software-base systems and methods, the disclosed software may comprise a tool that operates to validate and distribute test data stored in a network-accessible database. A Coordinator may use the tool to validate the test data stored in that database and control User access to this test data. Users may be provided restricted access to data stored in the database, data that they themselves requested through the Coordinator. The tool may also track data usage, thus providing the Coordinator a means to ensure that Users are actually using the test data that they requested. The tool may also provide a means to prevent reuse of test data and a means to restore test data mistakenly deleted from the database.

Referring to FIG. 1, an illustrative enterprise network 100 is depicted consisting of a Data Management System server 110 and a Test Distribution System server 160. The Data Management System 110 server may access and copy enterprise data 220, stored in one or more enterprise databases 200 located on network-accessible storage disks 190, to a test data database 180 located on a network-accessible storage disk 175. One or more developers 120, 130, 140 may access and copy data from the test data database 180 for use in testing products under development. These developers 120, 130, 140 may access test data 210 using a software tool 170 located on the Test Data Distribution System server 160. The Tool 170 provides a developer interface permitting access to and copying of test data 210 from the test data database 180 to the developers 120, 130, 140.

Figure 2:
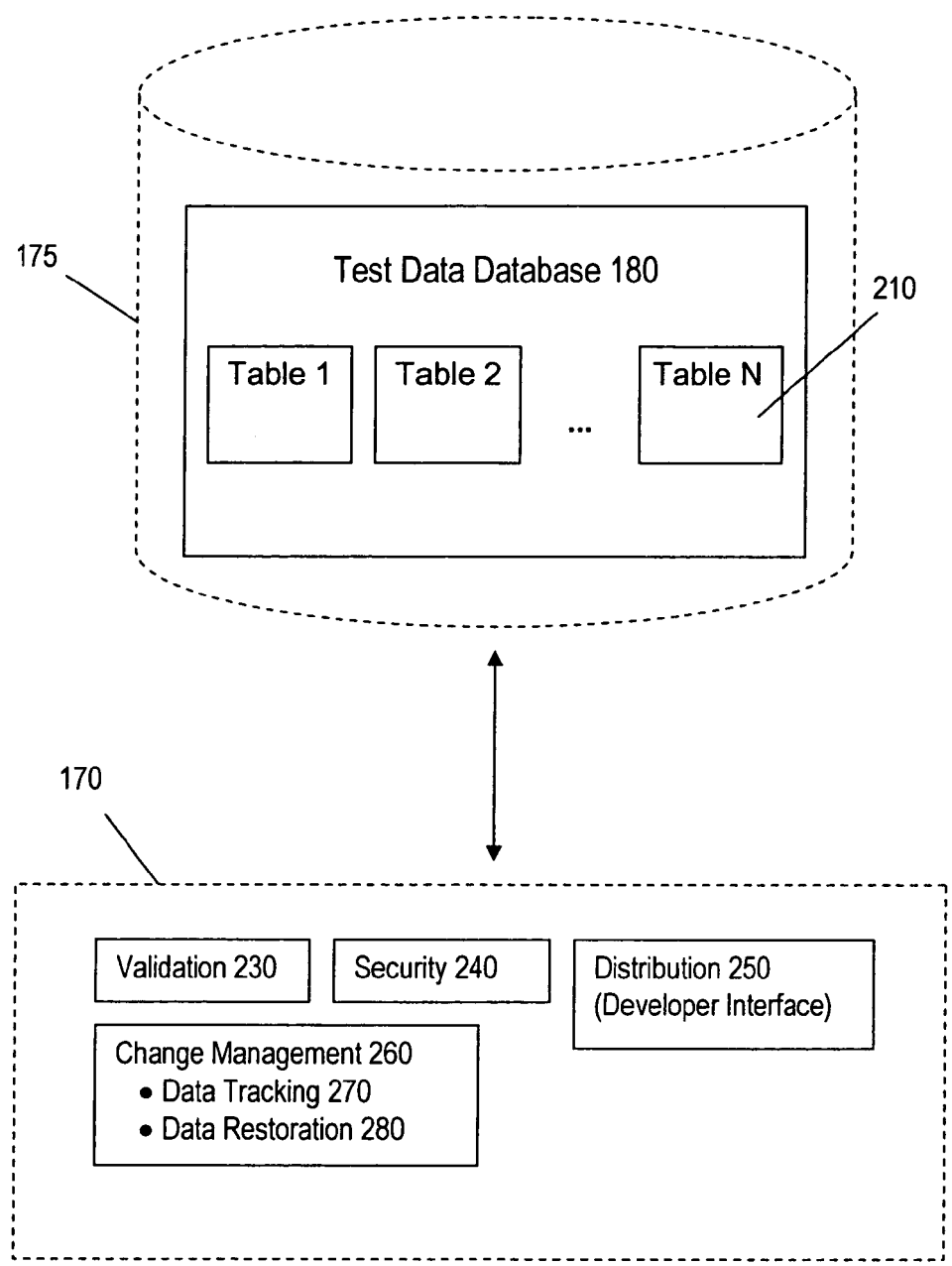
FIG. 2 is a block diagram of an illustrative test data distribution system.

FIG. 2 depicts a block diagram wherein the Tool 170 may be used to validate and distribute test data 210 stored in the test data database 180. As described above, the test data 210 is a subset of enterprise data 220 stored in the enterprise database 200 (FIG. 1). The Data Management System server 110 stores enterprise data 220 in multiple tables contained within the test data database 180, similar to sheets in a typical Excel database. After enterprise data 220 is copied into the test data database 180, the Tool 170 may be used to distribute that test data 210 to multiple developers 120, 130, 140 (FIG. 1). The Tool 170 consists of numerous software subroutines configured to execute a number of tasks, including distributing test data 210 as just discussed. In some embodiments, the Tool 170 consists of a Validation Subroutine 230, a Security Subroutine 240, a Distribution Subroutine 250, and a Change Management Subroutine 260, which may include a Data Tracking Subroutine 270 and a Data Restoration Subroutine 280.

The Validation Subroutine 230 is a set of software instructions that, when executed, may permit the Coordinator to validate selected test data 210 stored in the test data database 180 to ensure that the test data 210 is error-free. The Tool 170 may be configured to permit only the Coordinator to launch the Validation Subroutine 230. When executed by the Coordinator, the Validation Subroutine 230 may systematically sort through selected test data stored in the test data database 180, comparing the selected test data to a validator also selected by the Coordinator. The Validation Subroutine 230 may include one or more defined validators, including "Hexidecimal ESN InUse Validator", "Hexidecimal ESN Unused Validator", "Acctnum is Valid", "Acctnum In Collections", "Acctnum Not In Collections", and "SubscriptionID is Valid". By way of example, the Coordinator may wish to verify that each account number listed in a particular table within the test data database 180 is a valid account number. To do so, the Coordinator may select "Acctnum is Valid" as the validator. When the Coordinator executes the Validation Subroutine 230, the Validation Subroutine 230 then systematically compares each entry in the column of data including "account numbers" in the selected table to the validator "Acctnum is Valid" to ensure that each account number listed in the selected table is valid. The actual comparison may be as simple as verifying that the account number listed has the same number of digits as the validator, the same format as the validator, or something more involved. If the Validation Subroutine 230 determines that a particular account number in the selected table is invalid, the Validation Subroutine 230 marks that record, or row of data in the table including the particular account number, as "Fail"; otherwise, that record is designated as "Pass", meaning it is error-free. Upon completion of validating the selected test data, the Coordinator may delete all records in the selected table associated with a failed account number.

Test data 210 stored in the test data database 180 may be both passively and actively secured. With existing methods of distributing test data, the DMG emails text files containing test data to Users. In contrast, using the disclosed method of distributing test data, Users may access test data 210 stored in the test data database 180 and copy that data 210 to a remotely located output file of their choosing, thus eliminating the possibility that unintended recipients or hackers may receive test data 210 sent by email. This is a passive method of securing test data 210 distributed to the Users. The Tool 170 may also consist of an active method of securing test data 210 stored in the test data database 180. The Security Subroutine 240 is a set of software instructions that, when executed, may permit the Coordinator to define which Users may have access to test data 210 stored in the test data database 180. The Security Subroutine 240 may permit the Coordinator to define unlimited access to all test data 210 for a particular User or to restrict that User's access to specific tables and specific numbers of records within those tables. This allows the Coordinator to prohibit access to the database 180 by individuals who have not properly requested test data 210 and to restrict access of a given User only to the test data 210 actually requested by that User. Moreover, the Security Subroutine 240 may permit only the Coordinator to define such User access, providing additional security for the test data 210.

The Distribution Subroutine 250 is a set of software instructions that, when executed, may permit the User to select test data 210 stored in the test data database 180 and copy that data 210 in a User-specified format to a remotely located output file defined by the User. The Distribution Subroutine 250 may comprise two algorithms that allow the User to select and copy test data 210. The first algorithm may permit the User to select and copy a single column of test data 210 in a User-selected table. The second algorithm may permit the User to select multiple columns of test data 210 from one or more tables of data. Regardless of the algorithm selected by the User, both algorithms may permit the User to select the number of records to be generated, meaning the number of rows of test data 210 to be copied from the test data database 180, to define the output file path and name, and to choose from among various options for formatting data contained in the output file.

The Change Management Subroutine 260 is a set of software instructions that may permit test data 210 to be deleted from the test data database 180 after a User has copied that test data 210 to a remotely located output file using the Distribution Subroutine 250. The purpose of deleting test data 210 from the database 180 after a User has copied it is to prevent reuse of the test data 210. The Change Management Subroutine 260 may also consist of the Data Tracking Subroutine and the Data Restoration Subroutine 280.

The Data Tracking Subroutine 270 is a set of software instructions that may permit information or statistics regarding test data 210 usage to be compiled and viewed by both the Coordinator and Users with access to the test data database 180. When a User selects and copies test data 210 from the test data database 180 using the Distribution Subroutine 250, information regarding that distribution may be logged or recorded by the Data Tracking Subroutine 270. The Coordinator and Users with access to the database 180 may view this log from within the Tool 170. This log may contain the date, time, User identification, the application for which the test data 210 is intended, the number of records copied, and the identification number for the data 210 copied. Such information may permit the Coordinator to compare the volume and type of test data 210 used by a particular User to that actually requested by him to ensure each User is actually using all that he is requested and not wasting it, so to speak.

The Data Tracking Subroutine 270 may also track other information related to the test data 210. Each record of test data 210 stored in the test data database 180 may be assigned an arbitrary identification number. The Data Tracking Subroutine 270 may be configured to track the identification number associated with failed test data 210 deleted from the test data database 180 after validation by the Coordinator using the Validation Subroutine 230 and with test data 210 deleted after a User has copied it to a remotely located output file using the Distribution Subroutine 250. The Data Tracking Subroutine 270 may thus provide the Coordinator with a means of identifying test data 210 deleted from the test data database 180.

The Data Restoration Subroutine 280 is a set of software instructions that may permit the Coordinator to restore test data 210 that is deleted, as described above, to the test data database 180. This subroutine 280 may permit the Coordinator to restore test data 210 corresponding to a specific identification number from a backup copy of the test data database 180.

Figure 3:
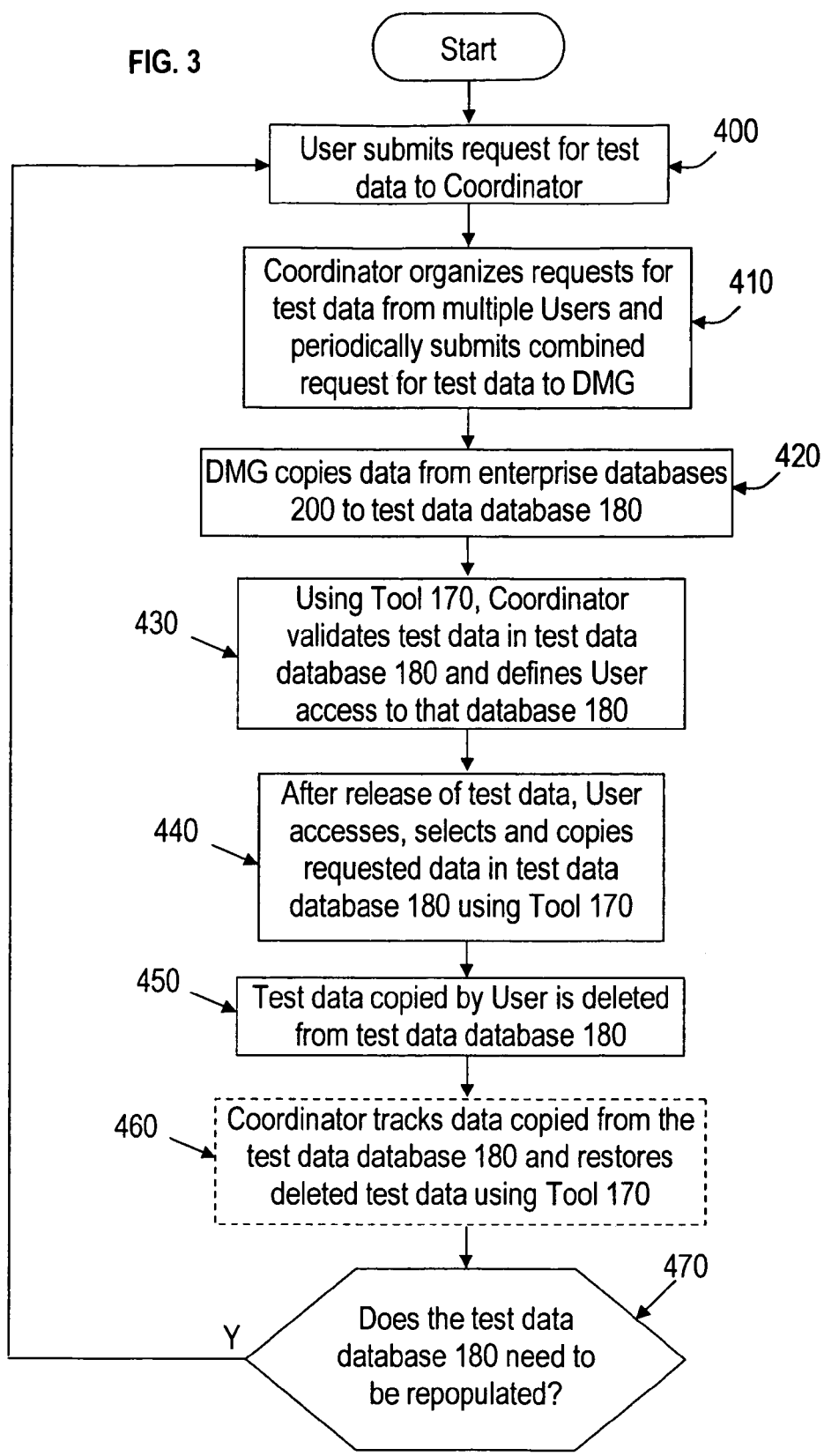
FIG. 3 is a logic diagram of an illustrative method for distributing test data.

Referring next to FIG. 3, a flowchart is provided to illustrate various method embodiments for validating and distributing test data 210 stored in the test data database 180. The method embodiments may begin when a User in need of test data submits a request for test data to the Coordinator (block 400). The Coordinator may receive this request for test data and similar requests from other Users. The Coordinator may then organize these individual requests and periodically submit a combined request, encompassing all individual requests (recall block 400), for test data to the DMG (block 410).

In response to the Coordinator's request (recall block 410), the DMG may access enterprise data 220 (FIG. 1) and copy requested data into the test data database 180 located on disk 175 (block 420). In filling the Coordinator's request for data, the DMG may access multiple enterprise databases 200. Once the DMG has filled the Coordinator's request, the DMG notifies the Coordinator that the requested test data has been copied into the test data database 180.

Figure 4:
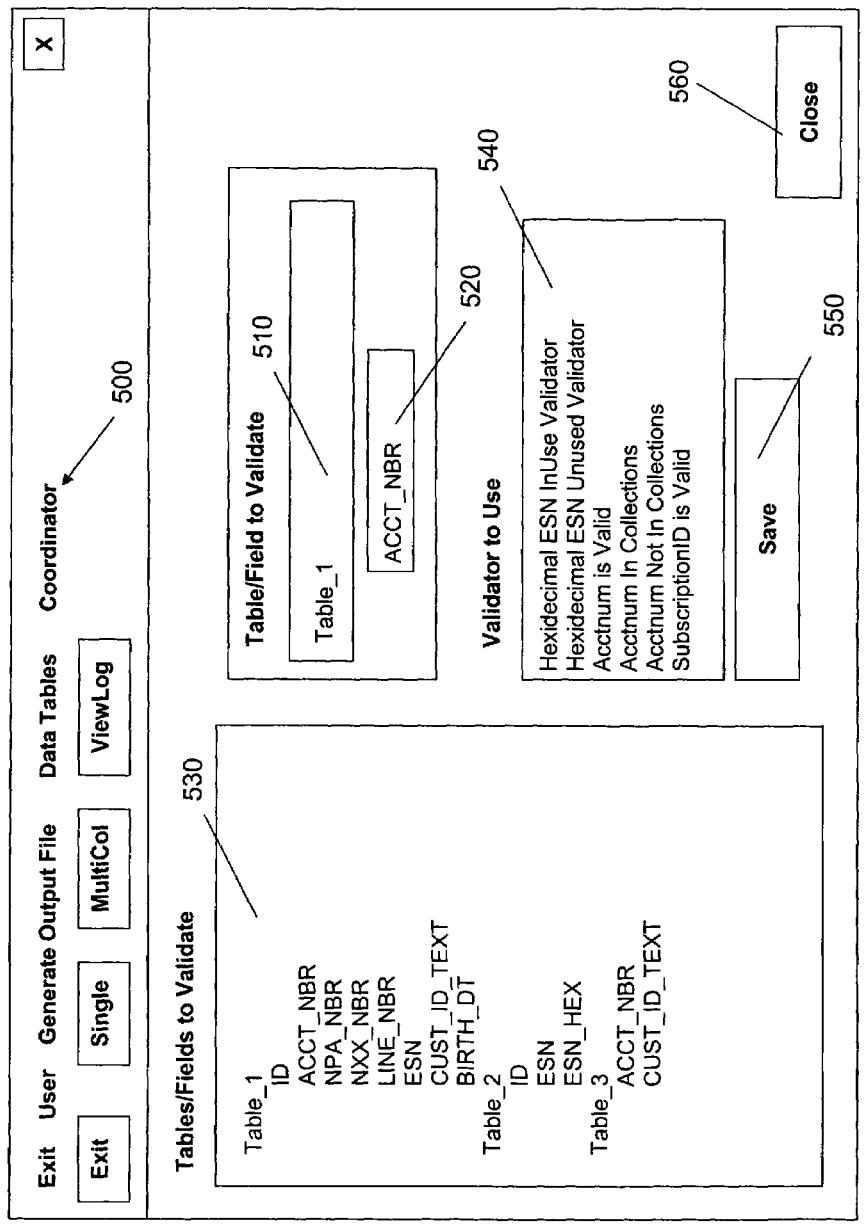
FIG. 4 illustrates a graphical user interface (GUI) to select criteria for validation.

In its present state, the test data 210 in the Access 180 may contain errors. Therefore, the Coordinator may access the Tool 170 to execute the Validation Subroutine 230 on the newly deposited test data 210 to remove records containing errors (block 430). For each table of test data 210 to be validated, the Coordinator may select a validator and define the field, or column, of test data 210 within the selected table to be validated. FIG. 4 illustrates a GUI that may be accessible to the Coordinator once he has logged into the Tool 170. Under the "Coordinator" drop-down menu 500, the Coordinator may be presented the means to select a field 520 within a table 510 to validate from a list summarizing possible choices 530 and a validator 540. The Coordinator must select a validator 540 that is appropriate for the selected field 520 to be validated. For example, if the field 520 to be validated consists of account numbers, the validator 540 selected must be one used to validate account numbers, not other types of data. In this example, an appropriate choice for a validator 540 may be "Acctnum is Valid" or "Acctnum in Collections", not "Hexidecimal ESN InUse Validator". Having made his selections, the Coordinator may then save those selections by selecting the "Save" button 550 and exit this GUI by selecting the "Close" button 560.

Figure 5:
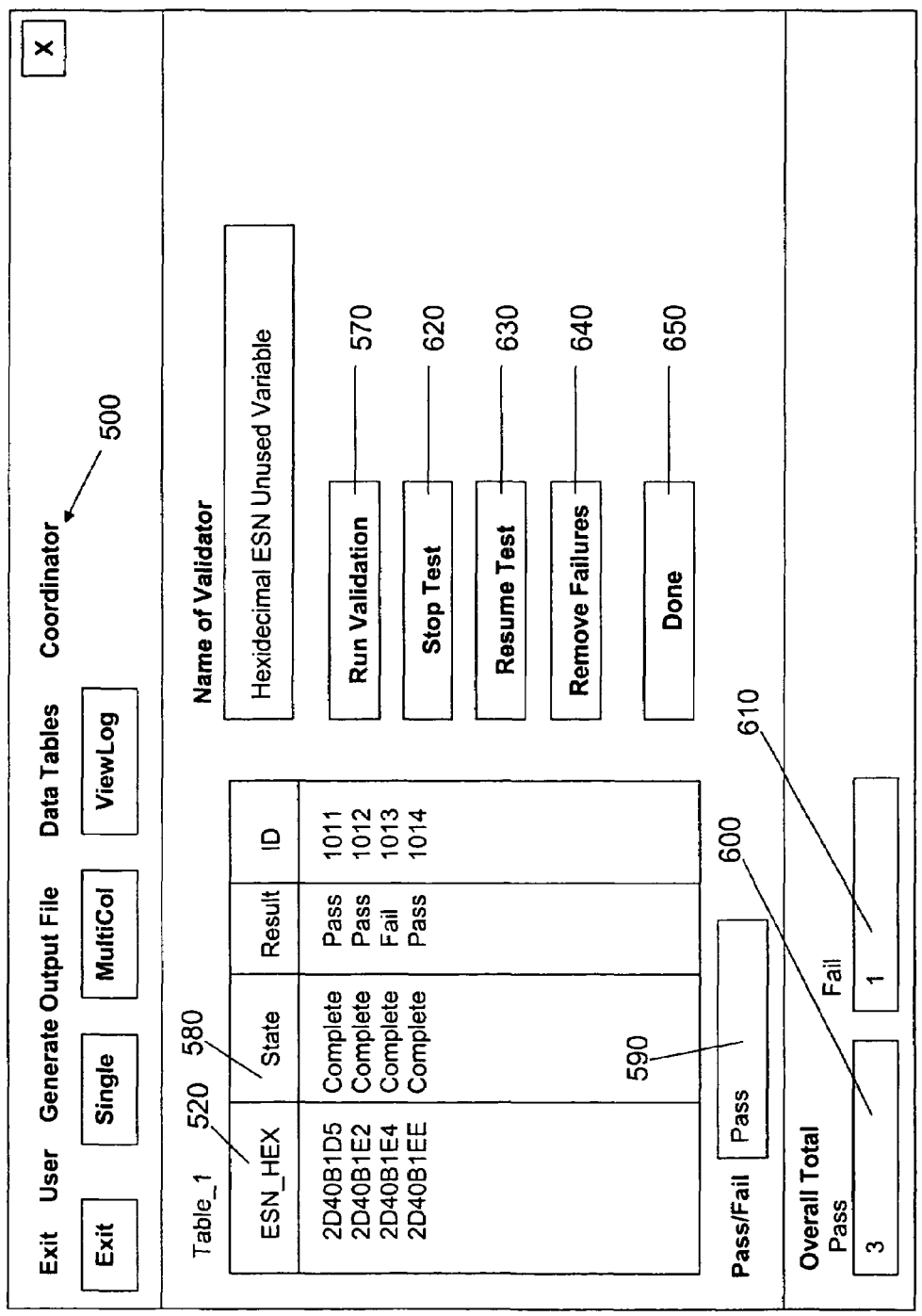
FIG. 5 illustrates a GUI for validation.

Now, the Coordinator is ready to execute the Validation Subroutine 230 to validate the selected field 520 in the selected table 510 using the selected validator 540. FIG. 5 illustrates a GUI, also available under the "Coordinator" drop-down menu 500, that may provide a means to execute the Validation Subroutine 230. The Coordinator may select the "Run Validation" button 570 to execute this Subroutine 230. As the validation process proceeds, validation results for each entry in the selected field 520 may be summarized in tabular format 580. Also, the validation result, meaning "PASS" or "FAIL", for each entry as it is processed may be viewed 590. The overall totals of "PASS" and "FAIL" for entries processed may also be displayed in windows 600 and 610, respectively. The Coordinator may choose to interrupt and resume the validation process at any time by selecting the "Stop Test" button 620 and the "Resume Test" button 630, respectively. When the validation process is completed, the Coordinator may delete records containing erroneous data by selecting the "Remove Failures" button 640. The Coordinator may then exit this GUI by selecting the "Done" button 650.

Figure 6:
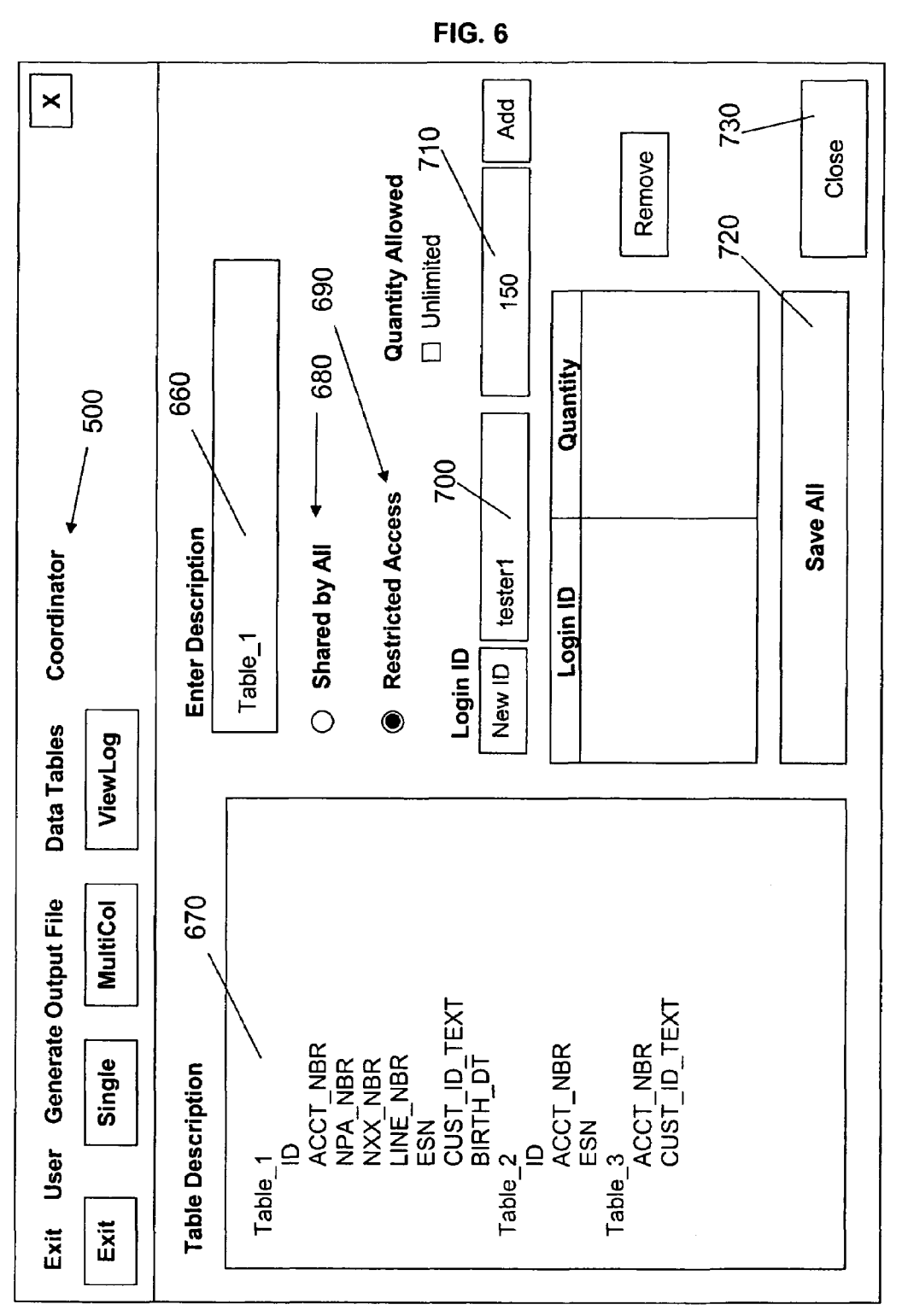

Next, the Coordinator may define which Users may access the test data database 180 and the limits of their access to the test data 210 contained therein (block 430). FIG. 6 illustrates a GUI, also accessible under the "Coordinator" drop-down menu 500, that may permit the Coordinator to define User access to the test data database 180. The Coordinator may first select a table 660 from a list 670 of possible choices. He then may allow all Users unlimited access to the test data contained within that table 660 by selecting the "Shared by All" button 680. Alternatively, he may desire to limit access to that table 660 by selecting the "Restricted Access" button 690 and then entering each User's "Login ID" 700 and specifying the number of records 710 allowed that User until access to the table 660 has been completed defined and saved by selecting the "Save All" button 720. The Coordinator may repeat this process for each table contained in the test data database 180. When User access has been defined for all tables contained in the database 180, the Coordinator may exit this GUI by selecting the "Close" button 730.

Figure 7:
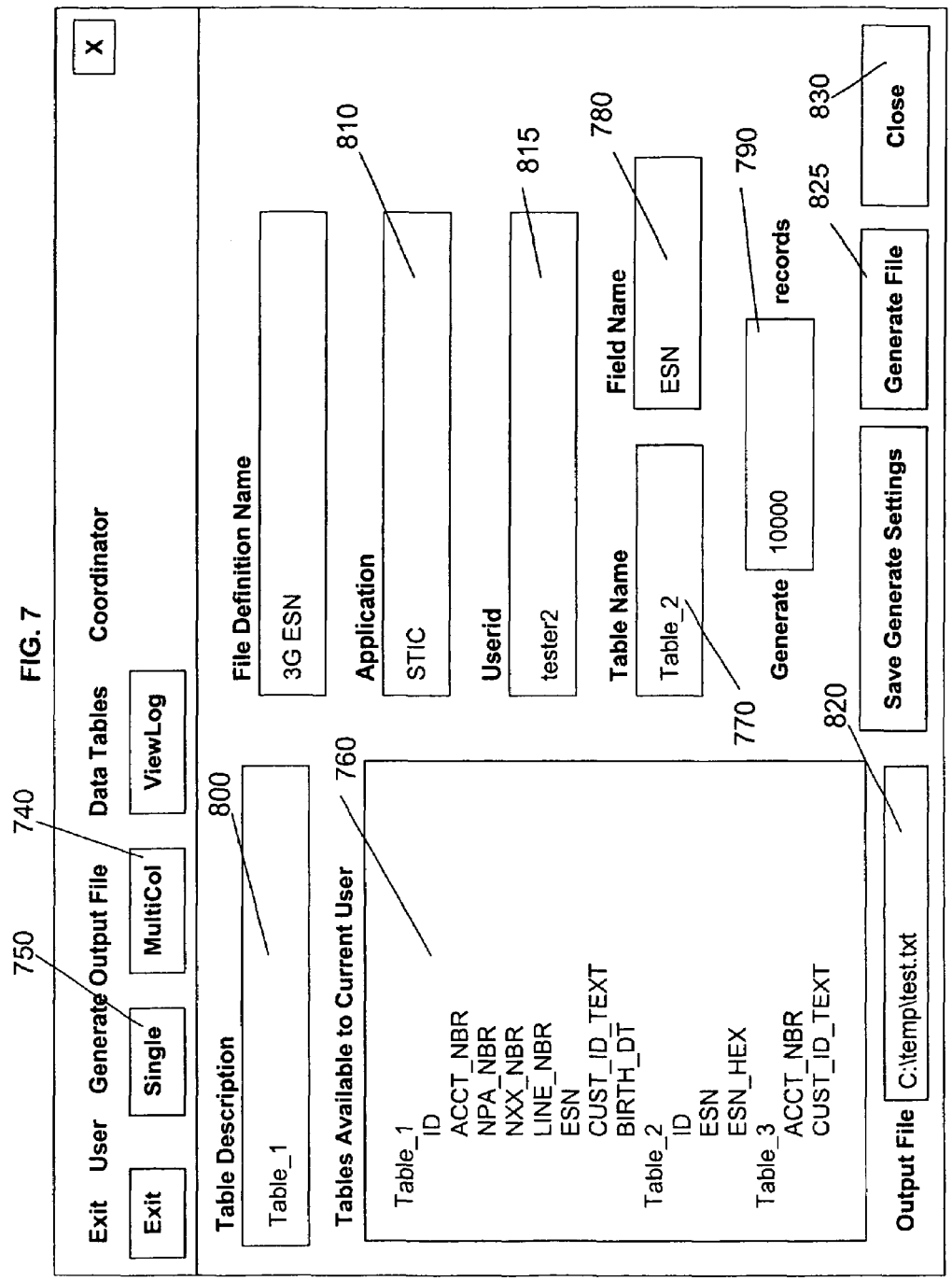
FIG. 7 illustrates a first GUI for test data distribution.

Once the Coordinator has validated test data 210 contained within the test data database 180 and defined User access to that test data 210 (recall block 430), the test data 210 is ready for release to the Users. The Coordinator may then notify the Users that their requested test data 210 is available for use. Each User may then access the test data 210 by logging into the Tool 170. After logging into the Tool 170, the User may select either the "MultiCol" button 740 or the "Single" button 750, as illustrated in FIG. 7, to select and copy requested test data 210 to a remotely located output file. If the User wishes to select and copy only a single column, or field, from a single table of test data 210, the User may select the "Single" button 750. On the other hand, if the User wishes to select and copy multiple fields of test data 210, the User may select the "MultiCol" button 740.

FIG. 7 illustrates a GUI that may be displayed when the User selects the "Single" button 750 to select and copy a single field of test data 210. Within that GUI, the User may be presented with a list 760 of tables and associated fields that he has access to, as defined by the Coordinator (recall block 430). He may then select the table 770 and field 780 within that table 770 to be copied and the number of records 790 to be generated from that table 770. He may also be prompted to provide a table description 800, the application for which this test data will be used 810, and his userid 815. Lastly, the User may define the output file 820 to which the selected data will be copied. Having made all necessary selections, the User may generate the output file 820 by selecting the "Generate File" button 825. The User may then exit this GUI by selecting the "Close" button 830.

Figure 8:
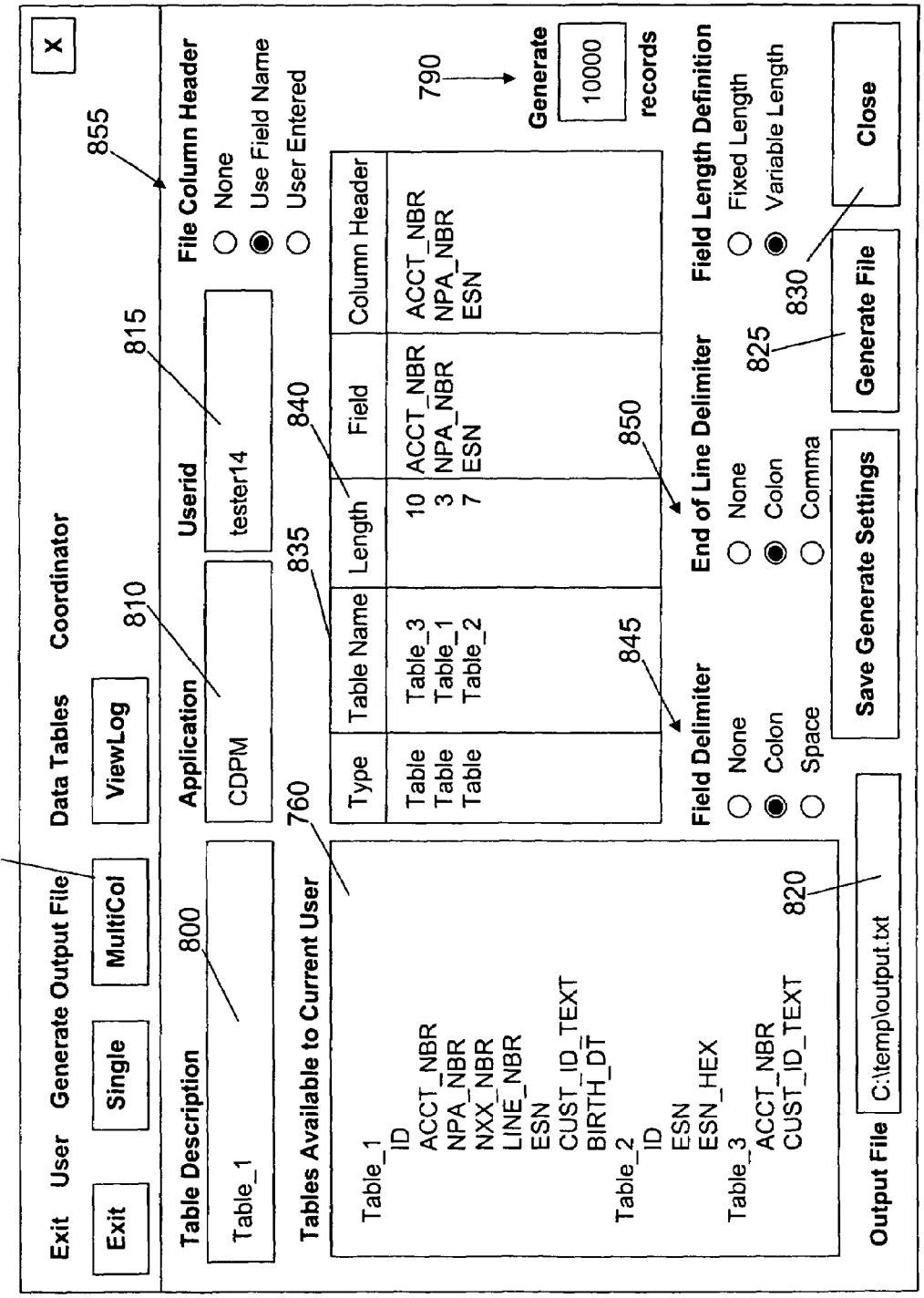
FIG. 8 illustrates a second GUI for test data distribution.

FIG. 8 illustrates a GUI that may be displayed when the User selects the "MultiCol" button 740. The User may be presented with a number of the same selections discussed above in reference to selection of the "Single" button 750. For example, the User may again be prompted to input a table description 800, the application for which this test data will be used 810, his userid 815, the number of records 790 to be generated, and the output file 820 to be generated. However, unlike the GUI illustrated by FIG. 7, this GUI may permit the User to select multiple fields of data within multiple tables from a list 760 of tables and associated fields that he has access to. As he selects a particular field within a particular table, his selections are summarized in order of selection in window 835. For example, as shown in window 835, the User has selected three fields of data from three different tables, specifically field "ACCT_NBR" from table "Table_3", field "NPA_NBR" from table "Table_1", and field "ESN" from table "Table_2". Other selections that the User may be presented within this GUI include formatting choices regarding the output file 820. He may define the field width 840, meaning the number of digits in the particular field, and select various formatting features including a field delimiter 845, an end of line delimiter 850, and a file column header 855. Having made all necessary selections, the User may generate the output file 820 by selecting the "Generate File" button 825. The User may then exit this GUI by selecting the "Close" button 830.

Once the User has selected and copied test data 210 from the test data database 180 (recall block 440), the Tool 170 deletes the copied test data from the test data database 180 to prevent subsequent Users from reusing that data (block 450). The Tool 170 may be configured to perform this task without any further interaction from the Coordinator or Users.

Figure 9:
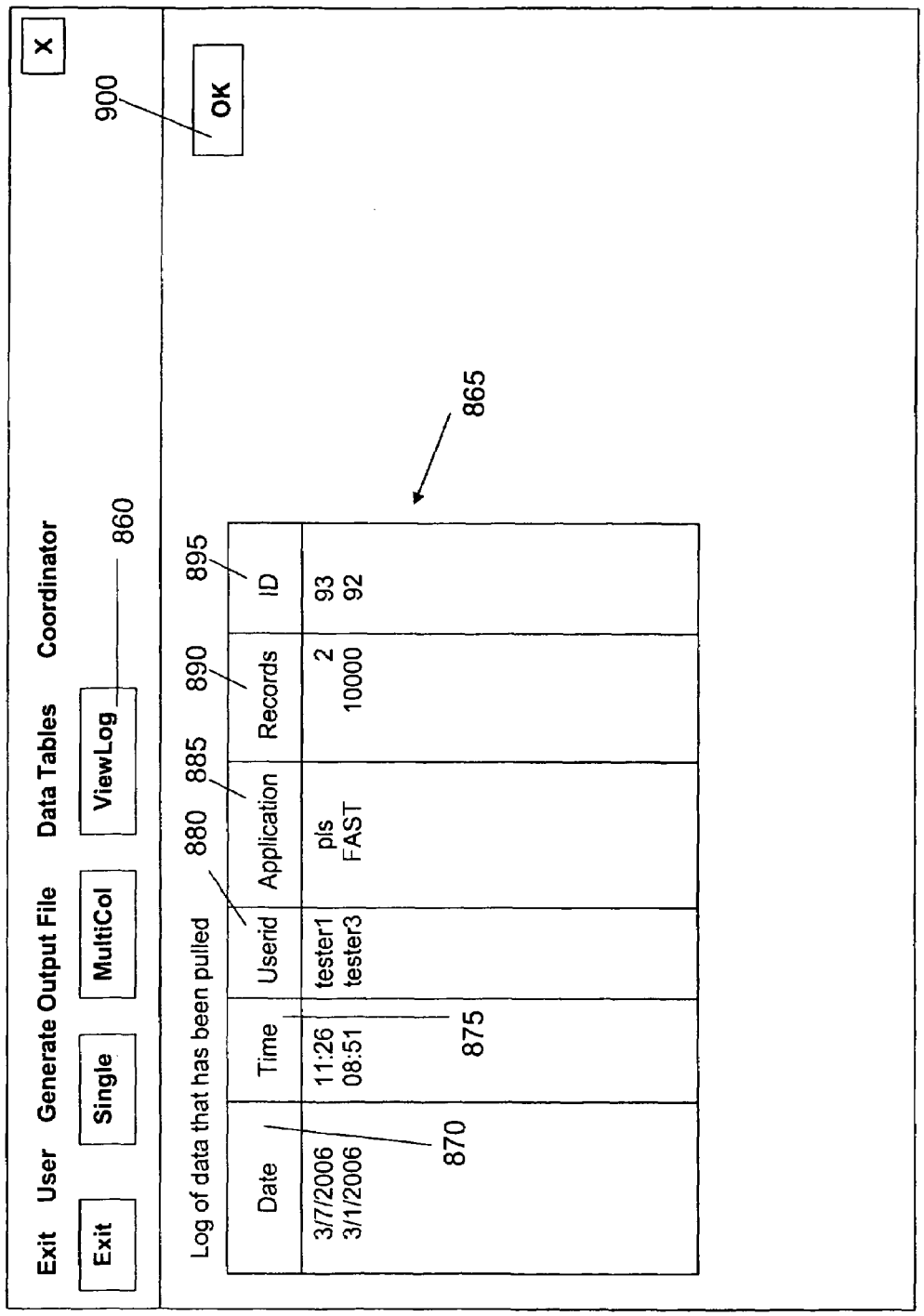
FIG. 9 illustrates a GUI for tracking.

Lastly, the Coordinator and Users may track test data usage by viewing a log of data that has been pulled or copied from the test data database 180 (block 460). To view this log, the User or Coordinator may select the "ViewLog" button from within the Tool 170. FIG. 9 illustrates a pull log 865 that summarizes the date 870, time 875, userid 880, application for which the data pulled is intended 885, number of records 890, and identification number 895 for test data pulled or copied from the test data database 180. Note that this test data has been deleted from the test data database 180 to prevent reuse (recall block 450) but can be restored by the Coordinator, if necessary, using the identification number 895 and the Tool 170, as discussed previously. To close the pull log 865, the User or Coordinator may select the "OK" button 900.

On a periodic basis, perhaps every two months, the test data database 180 may need to be repopulated with fresh test data 210 (block 470). At that time, any unclaimed test data 210 remaining in the test data database 180 may be deleted by the Coordinator in preparation for a new release of test data 210 and the method embodiment depicted by FIG. 3 repeated.

Although FIGS. 1 through 9 and related discussion define a Tool 170 that is configured to validate and distribute test data 210 stored in the test data database 180 by the DMG, one skilled in the art may readily appreciate that the Tool 170 may in other embodiments be configured to select and copy enterprise data 220 from enterprise databases 200 into the test data database 180, thus eliminating the need for the DMG to perform this task. In still other embodiments, the Tool 170 may be configured to receive individual requests for test data from the Users, organize those individual requests, and then periodically access the enterprise databases 200 to select and copy requested data, as just described. In other words, the Tool 170 may be configured to perform the functions defined in FIGS. 1 through 9 and related discussion for either or both the Coordinator and the DMG.

FIGS. 1 through 9 and related discussion also depict a Tool 170 wherein the Coordinator alone has the ability to validate test data 210 stored in the test data database 180. In other embodiments, the Tool 170 may be configured to permit each User to validate his own test data prior to copying that data from the test data database 180.

Figure 10:
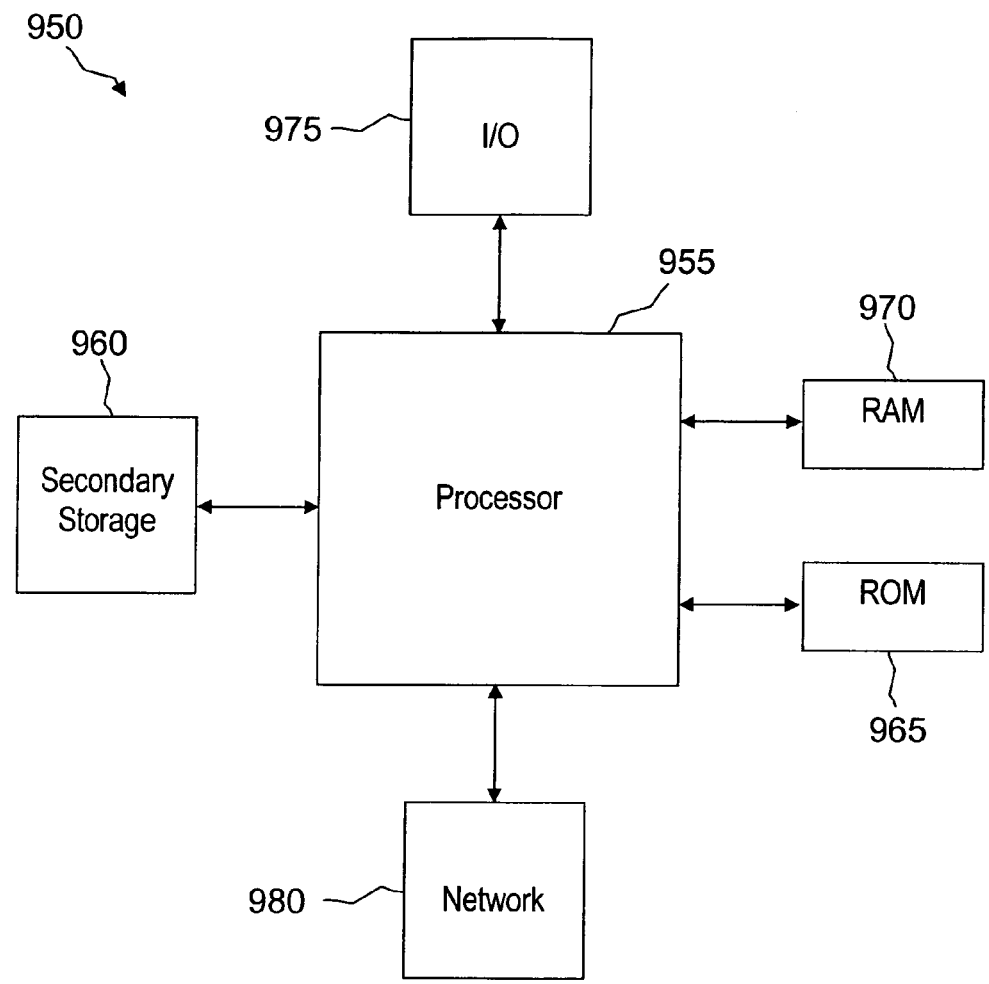
FIG. 10 is an illustrative general-purpose computer system suitable for implementing the disclosed systems and methods.

The systems, methods and software described above may be implemented on any general-purpose computer with sufficient processing power, memory resources, and network throughput capability to handle the necessary workload placed upon it. FIG. 10 illustrates a typical, general-purpose computer system suitable for implementing one or more embodiments disclosed herein. The computer system 950 includes a processor 955 (which may be referred to as a central processor unit or CPU) that is in communication with memory devices including secondary storage 960, read only memory (ROM) 965, random access memory (RAM) 970, input/output (I/O) 975 devices, and network connectivity devices 980. The processor may be implemented as one or more CPU chips.

The secondary storage 960 is typically comprised of one or more disk drives or tape drives and is used for non-volatile storage of data and as an over-flow data storage device if RAM 970 is not large enough to hold all working data. Secondary storage 960 may be used to store programs which are loaded into RAM 970 when such programs are selected for execution. The ROM 965 is used to store instructions and perhaps data which are read during program execution. ROM 965 is a non-volatile memory device which typically has a small memory capacity relative to the larger memory capacity of secondary storage. The RAM 970 is used to store volatile data and perhaps to store instructions. Access to both ROM 965 and RAM 970 is typically faster than to secondary storage 960.

I/O 975 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 980 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 980 devices may enable the processor 955 to communicate with an Internet or one or more intranets. With such a network connection, it is contemplated that the processor 955 might receive information from the network, or might output information to the network in the course of performing the above-described method steps. Such information, which is often represented as a sequence of instructions to be executed using processor 955, may be received from and outputted to the network, for example, in the form of a computer data signal embodied in a carrier wave Such information, which may include data or instructions to be executed using processor 955 for example, may be received from and outputted to the network, for example, in the form of a computer data baseband signal or signal embodied in a carrier wave. The baseband signal or signal embodied in the carrier wave generated by the network connectivity 980 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 955 executes instructions, codes, computer programs, scripts which it accesses from hard disk, floppy disk, optical disk (these various disk based systems may all be considered secondary storage 960), ROM 965, RAM 970, or the network connectivity devices 980.

While various system, method, and software embodiments have been shown and described herein, it should be understood that the disclosed systems, methods and software may be embodied in many other specific forms without departing from the spirit or scope of the invention. The present examples are to be considered as illustrative and not restrictive. The intention is not to be limited to the details given herein, but may be modified within the scope of the appended claims along with their full scope of equivalents.

What is claimed is:

1. A data distribution method comprising:
    copying enterprise data from enterprise databases and storing the enterprise data as test data in a test data database;
    defining access rights for users to the test data;
    copying selected test data contained within the test data database by a test data distribution system stored on a computer readable storage medium to an output file in response to a user's request for use in testing product;
    deleting the selected test data copied from the test data database by the test data distribution system in response to copying the selected test data to the output file; and
    validating test data prior to copying the selected test data, wherein validating comprises identifying invalid test data and deleting the invalid test data from the test data database.

2. The method of claim 1, further comprising receiving multiple requests for test data; organizing said multiple requests to define a combined request encompassing said multiple requests; and copying enterprise data from enterprise databases based on the combined request and storing the enterprise data copied based on the combined request as test data in the test data database.

3. The method of claim 1, wherein said copying to the output file is performed in accordance with a user-selected format and a user-defined output file name and path.

4. The method of claim 1, further comprising restoring test data erroneously deleted from the test data database.

5. The method of claim 1 further comprising periodically deleting the test data contained in the test data database and repopulating the test data database with data copied from the enterprise databases.

6. An enterprise network comprising:
    a plurality of enterprise databases; and
    a test data distribution system comprising:
        a test data database stored on a computer readable storage medium into which enterprise data from at least one of the enterprise databases is copied as test data;
        a validation subroutine stored on a computer readable storage medium and executable by a processor to validate the test data prior to use of the test data for testing and to identify invalid test data stored in the test data database, wherein the invalid test data is deleted from the test data database;
        a data tracking subroutine stored on a computer readable storage medium and executable by a processor to track a volume and type of the test data requested by a user and a volume and type of the test data copied from the test data database by the user; and
        a change management subroutine stored on a computer readable storage medium and executable by a processor to delete a portion of the test data stored in the test data database responsive to the portion of the test data being copied to an output file for use in testing products.

7. The network of claim 6, further comprising a security subroutine stored on a computer readable storage medium and executable by a processor to limit user access to the test data stored in the test data database.

8. The network of claim 6, further comprising a distribution subroutine stored on a computer readable storage medium and executable by a processor to receive a selection of the portion of the test data stored in the test data database.

9. The network of claim 8, wherein the distribution subroutine is further executable to copy the portion of the test data to the output file for use in testing products.

10. The network of claim 6, wherein said enterprise databases store customer information, including account numbers and phone numbers, and business-specific information, including valid and invalid account numbers, types of accounts, and accounts in collections.

11. A data distribution system comprising:
    a validation subroutine stored on a computer readable storage medium and executable by a processor to validate data contained in a test data database prior to use of the data for testing, the data contained in the test data database comprising enterprise data copied from at least one enterprise database;
    a security subroutine stored on a computer readable storage medium and executable by a processor to permit limited access to the test data database;
    a distribution subroutine stored on a computer readable storage medium and executable by a processor to receive selection of data contained in the test data database and to copy the selected data to an output file for use in testing products;
    a change management subroutine stored on a computer readable storage medium and executable by a processor to delete the selected data from the test data database in response to the selected data being copied to the output file; and
    a data tracking subroutine stored on a computer readable storage medium and executable by a processor to document data requests to copy enterprise data to the test data database and document test data retrieval by users copying test data from the test data database.

12. The system of claim 11, wherein said validation subroutine utilizes at least one selected validator to validate data contained in the test data database.

13. The system of claim 12, wherein said validation subroutine identifies erroneous test data from valid test data in said test data database by comparing entries in a selected column of data to said validator.

14. The system of claim 13, wherein said validation subroutine marks said erroneous test data.

15. The system of claim 13, wherein said validation subroutine is further configured to delete erroneous test data from the test data database.

16. The system of claim 11, wherein said validator is defined as criteria for validating account numbers, phone numbers, or other types of test data contained in the test data database.

17. The system of claim 11, wherein said security subroutine is configured to limit access to the test data database to only users who submitted test data requests and to limit each user's access to only data requested by the user.

18. The system of claim 11, further comprising a data restoration subroutine stored on a computer readable storage medium and executable by a processor to restore data erroneously deleted from the test data database using a data identification number documented by the data tracking subroutine.

* * * * *